(12) United States Patent
Kanamoto et al.

(10) Patent No.: US 9,765,822 B2
(45) Date of Patent: Sep. 19, 2017

(54) BEARING SEAL AND ROLLING BEARING WITH SEAL

(71) Applicants: Takahiro Kanamoto, Mie (JP); Wakana Inoue, Mie (JP)

(72) Inventors: Takahiro Kanamoto, Mie (JP); Wakana Inoue, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/794,887

(22) Filed: Jul. 9, 2015

(65) Prior Publication Data

US 2015/0308507 A1 Oct. 29, 2015

Related U.S. Application Data

(63) Continuation-in-part of application No. PCT/JP2014/050206, filed on Jan. 9, 2014.

(30) Foreign Application Priority Data

Jan. 10, 2013 (JP) ................................. 2013-002653

(51) Int. Cl.
*F16C 33/78* (2006.01)
*F16J 15/32* (2016.01)
(Continued)

(52) U.S. Cl.
CPC ........ *F16C 33/783* (2013.01); *F16C 33/7846* (2013.01); *F16C 33/7856* (2013.01);
(Continued)

(58) Field of Classification Search
CPC .. F16C 33/783; F16C 33/784; F16C 33/7846; F16C 33/7856; F16C 19/06; F16C 2300/14; F16J 15/3276
See application file for complete search history.

(56) References Cited

U.S. PATENT DOCUMENTS 3,123,367 A    3/1964 Brummer et al.
4,605,318 A  * 8/1986 Kaiser ................... F16C 19/163
                                                    277/353
(Continued)

FOREIGN PATENT DOCUMENTS

CN          1556902        12/2004
DE  102011121281 A1 * 6/2013 .............. F16C 33/76
(Continued)

OTHER PUBLICATIONS

Machine Translation of DE 19634383 dated Mar. 1998.*
(Continued)

*Primary Examiner* — Alan B Waits
(74) *Attorney, Agent, or Firm* — Wenderoth, Lind & Ponack, L.L.P.

(57) ABSTRACT

A bearing seal is fitted into a seal groove formed in an outer race, and firmly mounted to the outer race. First detent ribs and second detent ribs are formed on both surfaces of one side of a seal base plate made of rubber and having the shape of a strip. When one side of the seal base plate is fitted into the seal groove formed in an inner diameter surface of the outer race, the first detent ribs and second detent ribs come into elastic contact with the side surfaces of the seal groove, respectively, so as to prevent the bearing seal from being pulled out of the seal groove.

5 Claims, 7 Drawing Sheets

(51) Int. Cl.
  *F16J 15/3276* (2016.01)
  *F16C 19/06* (2006.01)
(52) U.S. Cl.
  CPC ........... *F16J 15/3276* (2013.01); *F16C 19/06* (2013.01); *F16C 2300/14* (2013.01)

(56) References Cited

U.S. PATENT DOCUMENTS

| | | | |
|---|---|---|---|
| 5,683,186 A * | 11/1997 | Akimoto | F16C 19/362 384/484 |
| 5,697,711 A * | 12/1997 | Aoki | F16C 33/7846 384/484 |
| 6,217,031 B1 * | 4/2001 | Catalano | F16C 19/166 277/500 |
| 9,169,874 B2 * | 10/2015 | Willaczek | F16C 33/76 |
| 2009/0162000 A1 | 6/2009 | Henneberger | |
| 2009/0324153 A1 * | 12/2009 | Russ | F16C 19/163 384/486 |
| 2012/0068413 A1 * | 3/2012 | Putt | F16C 33/7886 277/306 |
| 2012/0145227 A1 * | 6/2012 | Jun | F16B 21/073 136/251 |
| 2012/0161402 A1 | 6/2012 | Picatto et al. | |
| 2013/0062833 A1 * | 3/2013 | Frank | F16C 33/783 277/345 |
| 2013/0101242 A1 | 4/2013 | Sebald | |
| 2013/0323061 A1 * | 12/2013 | Jacquemont | F16C 33/782 416/174 |

FOREIGN PATENT DOCUMENTS

| | | | |
|---|---|---|---|
| JP | 2-18552 | 2/1990 | |
| JP | 6-26077 | 2/1994 | |
| JP | 2001-227553 | 8/2001 | |
| JP | 2007-239774 | 9/2007 | |
| JP | 4140411 B2 * | 8/2008 | ............ F16C 33/783 |
| JP | 2009-540253 | 11/2009 | |
| JP | 4367635 B2 * | 11/2009 | .............. F16C 33/76 |
| JP | 2011-027235 | 2/2011 | |
| JP | WO 2011013551 A1 * | 2/2011 | ......... F16C 33/7886 |
| JP | 2011-202774 | 10/2011 | |
| JP | 2012-112488 | 6/2012 | |
| KR | 200450593 | 10/2008 | |
| MC | 19634383 A1 * | 3/1998 | ............ F16B 5/0024 |
| WO | 2009/149810 | 12/2009 | |
| WO | 2012/000913 | 1/2012 | |

OTHER PUBLICATIONS

Office Action issued Jun. 7, 2016 in corresponding Japanese Application No. 2013-002653, with English translation.
Extended European Search Report issued May 2, 2016, in corresponding European Patent Application No. 14738313.7.
International Search Report issued Apr. 15, 2014 in International (PCT) Application No. PCT/JP2014/050206.
Written Opinion of the International Searching Authority issued Apr. 15, 2014 in International (PCT) Application No. PCT/JP2014/050206 (with English translation).
Office Action dated Feb. 14, 2017 in Japanese Patent Application No. 2013-002653 (with English translation).

* cited by examiner

BEARING SEAL AND ROLLING BEARING WITH SEAL

CROSS REFERENCE TO RELATED APPLICATIONS

This application is a Continuation-In-Part (CIP) application of International Application PCT/JP2014/050206, filed Jan. 9, 2014, the contents of which are hereby incorporated by reference.

BACKGROUND OF THE INVENTION

The present invention relates to bearing seals which seal the respective open end portions of the bearing space defined between the opposed portions of an outer race and an inner race, and to a rolling bearing with the bearing seals.

Since rolling bearings are extremely large-sized which are used in CT scanner devices (medical devices) or wind power generating devices, it is necessary to seal the respective end portions of a bearing space by use of bearing seals each having a large diameter so as to prevent foreign objects from going into the bearing space. In order to reinforce such a bearing seal having a large diameter with a metal core, it is necessary to prepare a very large-sized mold for vulcanizing rubber or for forming a metal core, thus leading to high manufacturing costs and making this method unrealistic.

Therefore, as for such large-sized bearing seals as described above, as described in Japanese Unexamined Patent Application Publication No. 2011-202774, the respective open end portions of a bearing space are sealed by only bearing seals made of rubber.

Each bearing seal described in Japanese Unexamined Patent Application Publication No. 2011-202774 has a rectangular section and the shape of a strip. One side of each bearing seal having the shape of a strip is fitted into a seal groove formed in the inner diameter surface of an outer race so that the bearing seal is made annular-shaped along the seal groove, thereby sealing the respective open end portions of the bearing space defined between the opposed portions of the outer race and an inner race.

For each bearing seal described in Japanese Unexamined Patent Application Publication No. 2011-202774, if one side of the bearing seal is simply fitted into the corresponding seal groove formed in the outer race, since the support of the bearing seal is made unstable and thus the bearing seal might be pulled out of the seal groove, the seal bearing is bonded with an adhesive to the seal groove.

In this case, since it is necessary to uniformly apply an adhesive to one side of each bearing seal over its entire length, and also to remove oil from the surface of the bearing seal to which an adhesive is applied, the mounting of the bearing seal is extremely time-consuming. In order to easily mount each bearing seal, some points need to be improved.

SUMMARY OF THE INVENTION

It is an object of the present invention to provide bearing seals which can be easily fitted into respective seal grooves formed in a bearing race and can be kept firmly mounted to the bearing race, and a rolling bearing with the bearing seals.

In order to achieve the above object, the present invention provides a bearing seal comprising a strip-shaped seal base plate made of rubber and having a rectangular section, wherein one side of the seal base plate is configured to be fitted into a seal groove formed in an inner diameter surface of an outer bearing race or formed in an outer diameter surface of an inner bearing race so that the bearing seal is made annular-shaped along the seal groove, whereby a bearing space is sealed which is defined between the outer bearing race and the inner bearing race opposed to the outer race, characterized in that the one side of the seal base plate configured to be fitted into the seal groove constitutes a fitting portion having two side surfaces, wherein a plurality of detent ribs are formed on at least an outer side surface of the two side surfaces which is located closer to an open end of the bearing space, wherein the plurality of detent ribs are spaced apart from each other in a width direction of the seal base plate, and wherein the detent ribs are configured such that due to fitting of the fitting portion into the seal groove, distal ends of the respective detent ribs come into elastic contact with a side surface of the seal groove.

Also, the present invention provides a rolling bearing with a bearing seal, the bearing comprising: an outer race; an inner race incorporated inwardly of the outer race; and rolling elements incorporated between opposed portions of the outer race and the inner race, wherein a seal groove is formed at an end portion of an inner diameter surface of the outer race or at an end portion of an outer diameter surface of the inner race, and wherein the bearing seal is a strip member made of rubber and having a side portion configured to be fitted from an end of the side portion into the seal groove so that the bearing seal is made annular-shaped along the seal groove, whereby the bearing seal seals an opening of a bearing space defined between the opposed portions of the outer race and the inner race, characterized in that the bearing seal is the above-described bearing seal according to the present invention.

In order to mount the bearing seal according to the present invention to the outer race, the one side of the seal base plate on which the detent ribs are formed is fitted from an end of the one side into the seal groove formed in the outer race or the inner race so that the bearing seal is made annular-shaped along the seal groove with both ends of the bearing seal circumferentially being in abutment with each other.

Due to the mounting of the bearing seal as described above, when the detent ribs are fitted into the seal groove, the distal ends of the respective detent ribs are elastically deformed by coming into contact with the side surface of the seal groove, so as to strongly come into contact with the side surface of the seal groove. Due to this strong contact, it is possible to keep the bearing seal mounted to the outer race stably and firmly.

The detent ribs may comprise annular lips having the distal ends and configured such that due to the fitting of the fitting portion into the seal groove, the distal ends of the respective lips are elastically deformed so as to be bent rearward by coming into contact with the side surface of the seal groove, and such that due to said elastic deformation, the distal ends of the respective lips come into elastic contact with the side surface of the seal groove. Also, the detent ribs may comprise annular protrusions each having a circular arc-shaped section or a quadrangular section, and wherein the protrusions are configured such that due to the fitting of the fitting portion into the seal groove, the protrusions are elastically deformed in an axial direction by coming into contact with the side surface of the seal groove.

If heights of the detent ribs in their natural state are predetermined such that the more rearward, with respect to a direction in which the fitting portion is fitted into the seal groove, the detent ribs are located, the larger the heights of the detent ribs are, it is possible to easily fit the one side of the seal base plate into the seal groove, and also to increase the proof stress of the bearing seal against the tensile force to pull the bearing seal out of the seal groove.

If a radial positioning rib is formed on a side surface of the seal base plate that constitutes an outer side surface of the seal base plate when the seal base plate is mounted to one of the outer bearing race and the inner bearing race that is formed with the seal groove, wherein the radial positioning rib is configured to abut a circumferential surface of said one of the outer bearing race and the inner bearing race so as to control a fitting depth of the fitting portion in the seal groove, it is possible to keep constant the fitting depth of the seal base plate over its entire length in the seal groove, and thus to keep the bearing seal stably mounted to the outer race. Also, it is possible to confirm if the bearing seal is accurately mounted to the outer race by checking how the radial positioning rib is in abutment with the circumferential surface of the outer race or of the inner race.

If an axial positioning rib is formed on a side surface of the seal base plate that constitutes an inner side surface of the seal base plate when the seal base plate is mounted to one of the outer bearing race and the inner bearing race that is formed with the seal groove, wherein the axial positioning rib is configured to come into contact with an inner side surface of the seal groove so as to axially position the seal base plate, it is possible to keep the bearing seal more firmly mounted to the outer race.

In the rolling bearing with the bearing seal according to the present invention, if the seal groove has a pair of side surfaces axially opposed to each other, wherein at least one of the pair of side surfaces is tapered such that a distance between the pair of side surfaces decreases toward an opening of the seal groove from a deepest portion of the seal groove, it is possible to more effectively prevent the bearing seal from being pulled out of the seal groove.

In the present invention, as described above, the detent ribs are formed on at least one of both surfaces of the fitting portion configured to be fitted into the seal groove formed in the seal base plate, and when the one side (fitting portion) of the base plate is fitted into the seal groove formed in the outer race or in the inner race, the distal ends of the respective detent ribs strongly come into elastic contact with the side surface of the seal groove. Therefore, it is possible to keep the bearing seal firmly mounted to the outer race by easily fitting the one side of the seal base plate into the seal groove of the outer race or of the inner race.

DETAILED DESCRIPTION OF THE PREFERRED EMBODIMENTS

Figure 1:
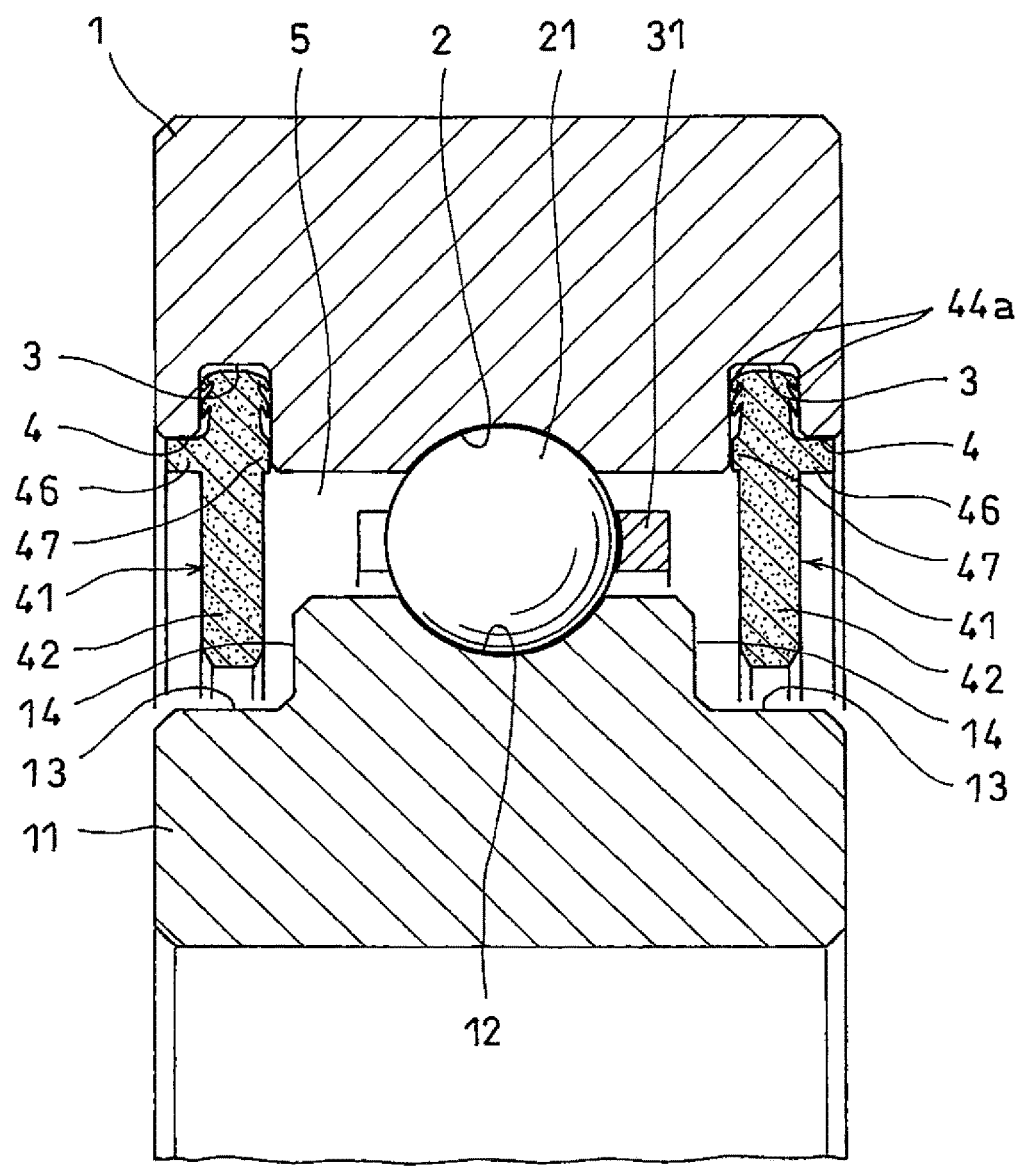
FIG. 1 is a sectional view illustrating an embodiment of a rolling bearing with bearing seals according to the present invention.

The embodiment of the present invention is now described with reference to the drawings. As illustrated in FIG. 1, the rolling bearing of the embodiment includes an outer race 1, an inner race 11 incorporated inwardly of the outer race 1, balls 21 (rolling elements) incorporated between a raceway groove 2 formed in the inner diameter surface of the outer race 1 and a raceway groove 12 formed in the outer diameter surface of the inner race 11, and a retainer 31 retaining the balls 21.

The outer race 1 includes seal grooves 3 formed at the respective axial end portions of its inner diameter surface, and large diameter cylindrical surfaces 4 formed on its inner diameter portion so as to be located outwardly of the respective seal grooves 3, the surfaces 4 each having a diameter smaller than the inner diameter of the seal groove 3 and larger than the inner diameter of the outer race 1. The outer peripheral portions of bearing seals 41 are supported in the respective seal grooves 3.

Figure 2:
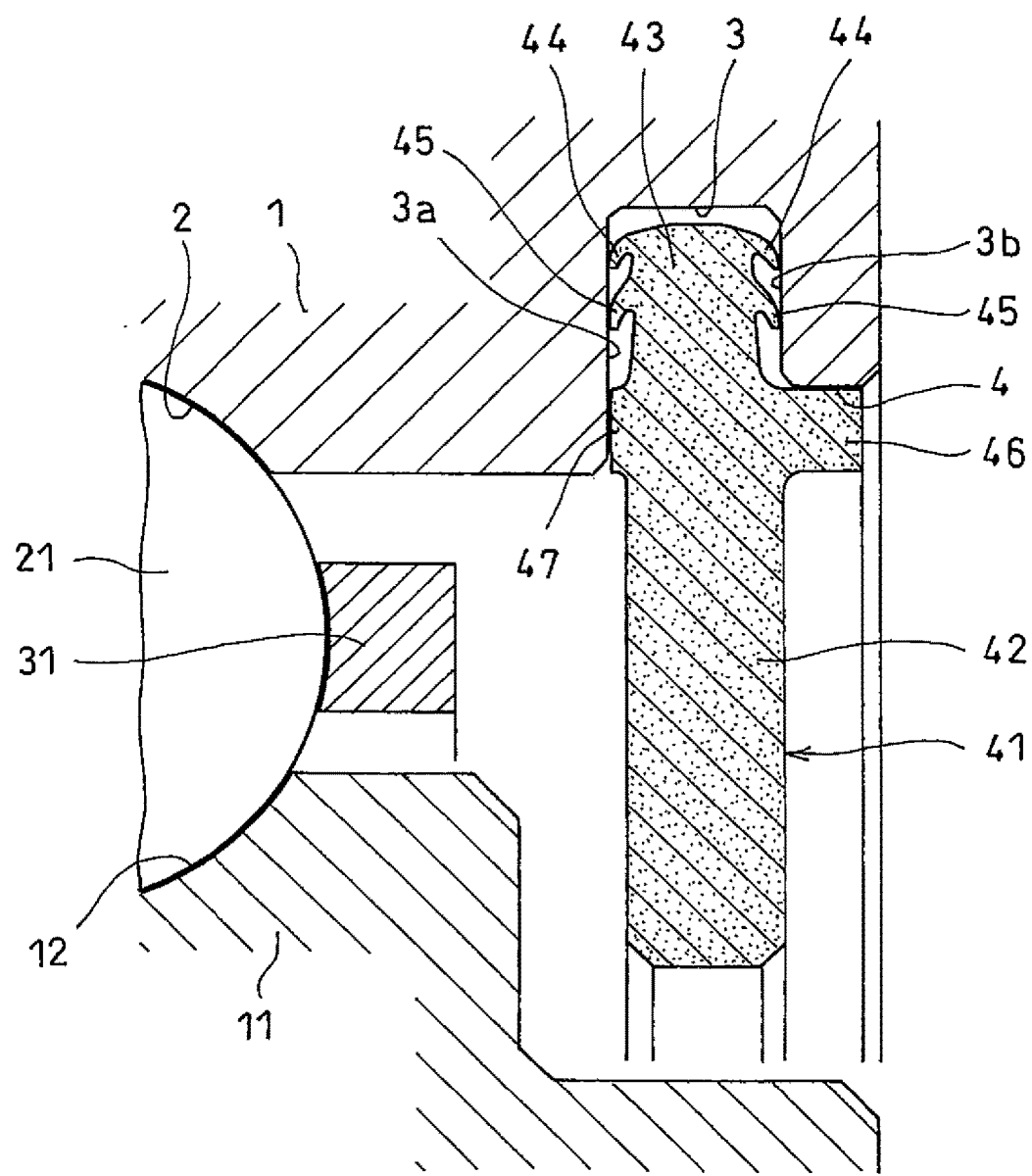
FIG. 2 is an enlarged sectional view of the portion of the rolling bearing in which one of the bearing seals of FIG. 1 is mounted.

As illustrated in FIGS. 1 and 2, with the inner peripheral portions of the bearing seals 41 opposed through small radial gaps to small diameter cylindrical surfaces 13 formed at the respective ends of the outer diameter surface of the inner race 11, and further with the inner peripheral portions of the seals 41 opposed through small axial gaps to side surfaces 14 extending radially from the roots of the respective surfaces 13, the seals 41 seal the respective openings of the bearing space 5 defined between the outer race 1 and the inner race 11, opposed to the outer race 1, thereby preventing foreign objects from going into the bearing space 5.

Figure 3:
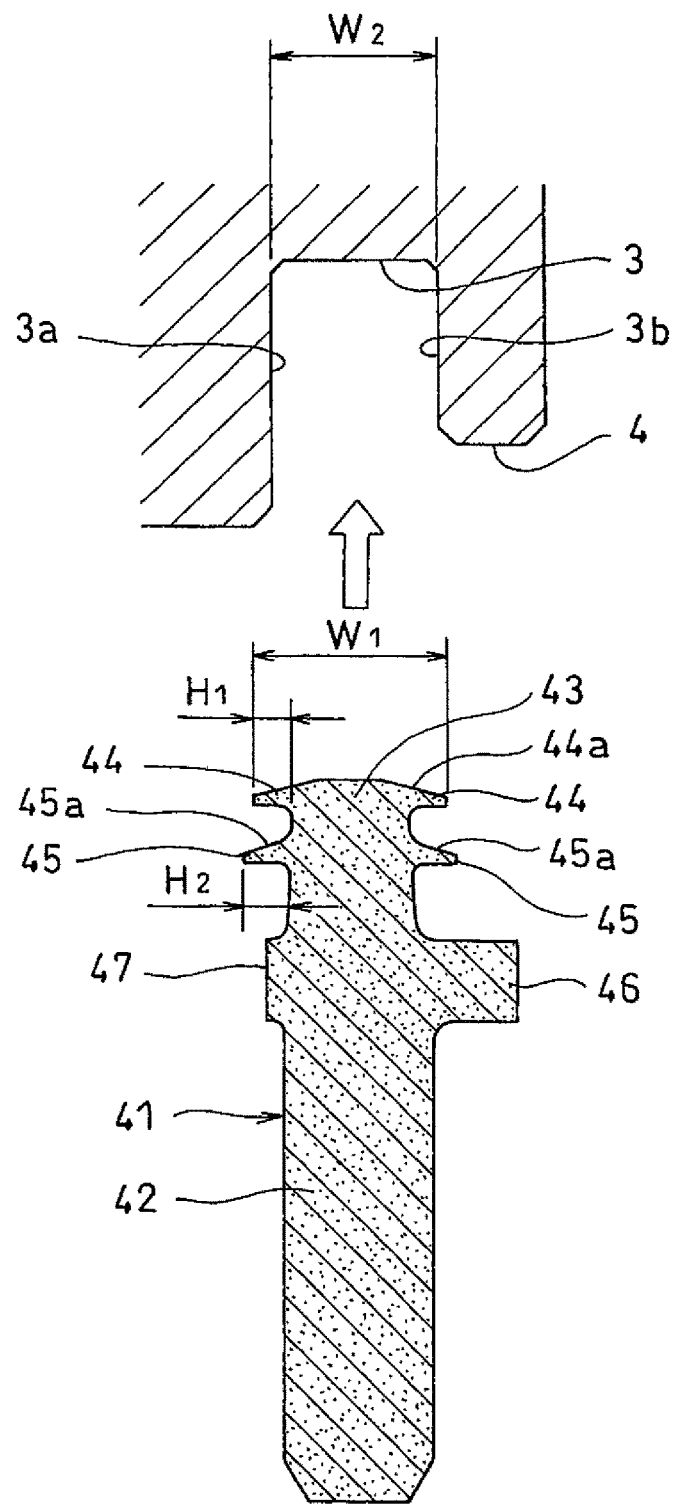
FIG. 3 is a sectional view illustrating the state before one of the bearing seals is mounted.

The bearing seals 41 are made of rubber. As illustrated in FIG. 3, each bearing seal 41 includes a seal base plate 42 having a rectangular section. The base plate 42 has the shape of a strip in its natural state, and includes a fitting portion 43 formed on one side thereof and configured to be fitted into the corresponding seal groove 3. The fitting portion 43 has a thickness thinner than the thickness of the portion of the seal base plate 42 other than the fitting portion 43, and includes first detent ribs 44 and second detent ribs 45 formed on both side surfaces thereof, respectively, such that the ribs 44 are spaced apart from the respective ribs 45 in the width direction of the seal base plate 42.

The first detent ribs 44 and the second detent ribs 45 of the fitting portion 43 comprise annular lips, and have front surfaces 44a front surfaces 45a, respectively, which are opposed to the seal groove 3, and tapered such that the distal ends of the detent ribs 44 and 45 are located toward the other side of the seal base plate 42 relative to the respective root portions of the front surfaces 44a and 45a at which the front surfaces 44a and 45a are connected to the seal base plate 42.

The distance $W_1$ between the distal ends of the pair of first detent ribs 44 formed on both sides of the fitting portion 43 is predetermined to be larger than the width $W_2$ of the seal groove 3. Therefore, when the fitting portion 43 is fitted into the seal groove 3, the distal ends of the first detent ribs 44 are fitted into the seal groove 3 while being elastically deformed so as to be bent rearward with respect to the fitting direction by coming into contact with the side surfaces 3a and 3b of the seal groove 3.

The first detent rib 44 and the second detent rib 45 are formed so as to satisfy the formula "$H_2 > H_1$", where H1 is the height of the rib 44 and H2 is the height of the rib 45.

As illustrated in FIG. 2, the seal base plate 42 is formed, on one of its side surfaces which becomes an outer side surface when the base plate 42 is mounted to the outer race 1, with a radial positioning rib 46. When the fitting portion 43 is fitted into the seal groove 3, the radial positioning rib 46 abuts the large diameter cylindrical surface 4, formed on the outer race 1, thereby controlling the fitting depth of the fitting portion 43.

Also, for each bearing seal 41, the fitting portion 43 of the seal base plate 42 is formed on its inner side surface with an axial positioning rib 47. The axial positioning rib 47 abuts the inner side surface 3a of the seal groove 3, thereby axially positioning the bearing seal 41.

The rolling bearing with the bearing seals according to the embodiment is configured as described above. In order to mount each bearing seal 41 to the outer race 1, as illustrated in FIG. 3, the edge portion of the bearing seal 41 having the shape of a strip is inserted into the outer race 1 so as to be radially opposed to the corresponding seal groove 3.

Thereafter, the fitting portion 43 (edge portion) of each bearing seal 41 opposed to the corresponding seal groove 3 is inserted from its edge into the groove 3, so that the seal 41 is made annular-shaped along the groove 3 with both ends of the seal 41 circumferentially being in abutment with each other. The fitting portion 43 is fitted into the seal groove 3 until the radial positioning rib 46 abuts the large diameter cylindrical surface 4, formed at the end of the inner diameter portion of the outer race 1. Due to this fitting, as illustrated in FIG. 2, the axial positioning rib 47 abuts the inner side surface 3a of the seal groove 3.

When the bearing seals 41 are mounted to the outer race 1 as described above, the first detent ribs 44 and the second detent ribs 45, formed on both side surfaces of each fitting portion 43, are elastically deformed so as to be bent rearward with respect to the fitting direction by coming into contact with the side surfaces 3a, 3b of the corresponding seal groove 3, respectively.

Since the front surfaces 44a of the first detent ribs 44 and the front surfaces 45a of the second detent ribs 45 are tapered surfaces, and also the heights $H_1$ of the ribs 44 are each lower than the height $H_2$ of the opposed rib 45, it is possible to smoothly insert the fitting portions 43 into the respective seal grooves 3, namely, to easily mount the bearing seals 41 to the outer race 1.

Also, with the bearing seals 41 mounted to the outer race 1, as illustrated in FIG. 2, since the distal ends of the first detent ribs 44 and the second detent ribs 45 strongly come into contact with the side surfaces 3a and 3b of the seal grooves 3, respectively, due to their elastic restoring force, and further the ribs 44 and 45 are inclined such that the distal ends of the ribs 44 and 45 are bent reward, when tensile force acts on the bearing seals 41 so as to pull the seals 41 out of the respective grooves 3, the distal ends of the ribs 44 and 45 bite the side surfaces 3a, 3b of the grooves 3, respectively. Therefore, the bearing seals 41 have strong proof stress against the tensile force to pull the seals 41 out of the respective seal grooves 3, thus making it possible to keep the seals 41 mounted to the outer race 1 stably and firmly.

Furthermore, since the fitting portion 43 of each bearing seal 41 is fitted into the seal groove 3 until the radial positioning rib 46 abuts the large diameter cylindrical surface 4, formed at the end of the inner diameter portion of the outer race 1, it is possible to keep constant the fitting depth of the fitting portion 43 over entire length thereof, and thus to keep the bearing seals 41 stably mounted to the outer race 1. Also, it is possible to confirm if the bearing seals 41 are accurately mounted to the outer race 1 by checking how the radial positioning ribs 46 are in abutment with the respective large diameter cylindrical surfaces 4 of the outer race 1.

Figure 4:
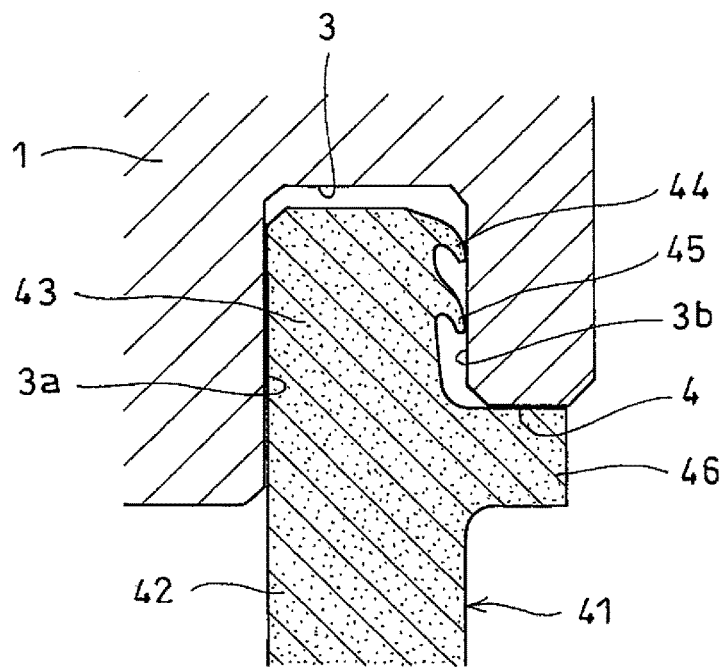
FIG. 4 is a sectional view illustrating a different bearing seal.

In the example illustrated in FIG. 2, the first detent ribs 44 and second detent ribs 45 are formed on both side surfaces of the fitting portion 43 of each bearing seal 41. However, as illustrated in FIG. 4, the first detent rib 44 and the second detent rib 45 on one side surface of the fitting portion 43 may be omitted.

Figure 5:
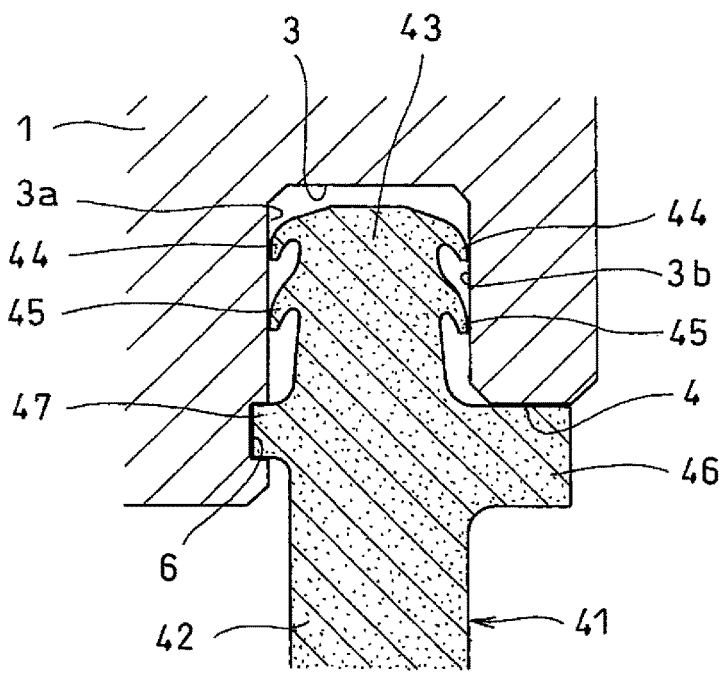
FIG. 5 is a sectional view illustrating a further different bearing seal.

As illustrated in FIG. 5, by providing the inner side surface 3a of each seal groove 3 with an engaging groove 6a in which the axial positioning rib 47 engages in the circumferential direction, it is possible to further increase the proof stress of the bearing seals 41 against the tensile force to pull the seals 41 out of the respective seal grooves 3, and thus to keep the seals 41 more firmly mounted to the outer race 1.

Figure 6:
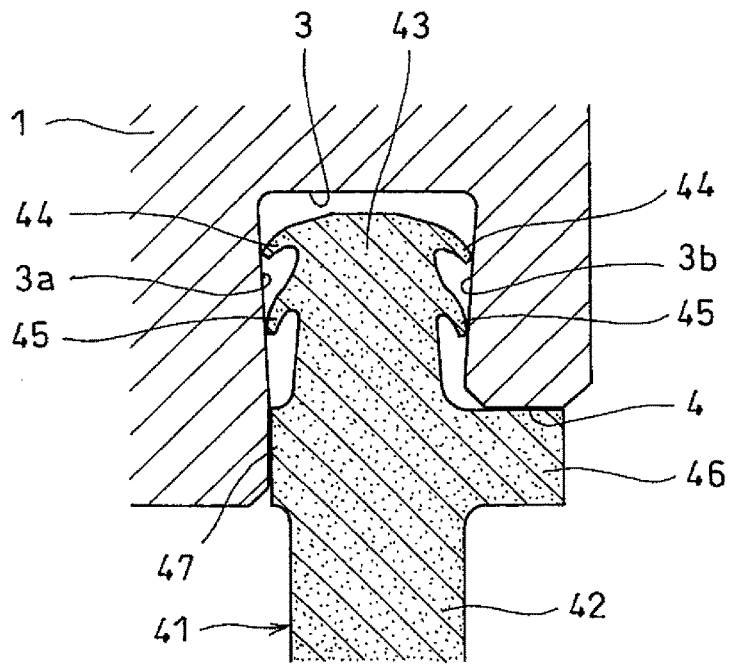
FIG. 6 is a sectional view illustrating a different seal groove.

As illustrated in FIG. 6, if the pair of side surfaces 3a, 3b of each seal groove 3 axially opposed to each other are tapered such that the distance between the surfaces 3a and 3b gradually decreases toward the opening of the groove 3 from the deepest portion (bottom portion) of the groove 3, it is possible to more reliably prevent the bearing seals 41 from being pulled out of the respective grooves 3.

Only one of the side surfaces 3a and 3b of each seal groove 3 axially opposed to each other may be tapered as described above.

Figure 7:
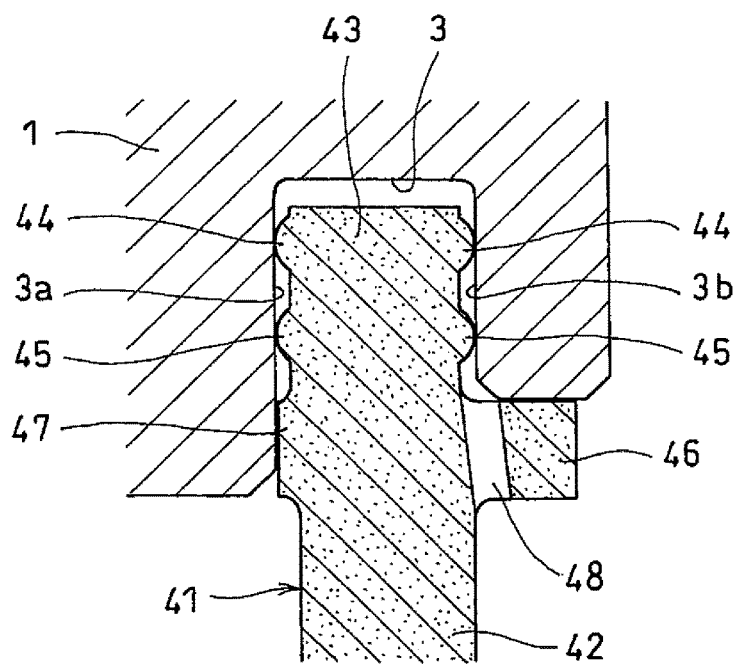
FIG. 7 is a sectional view illustrating a further different bearing seal.
Figure 8:
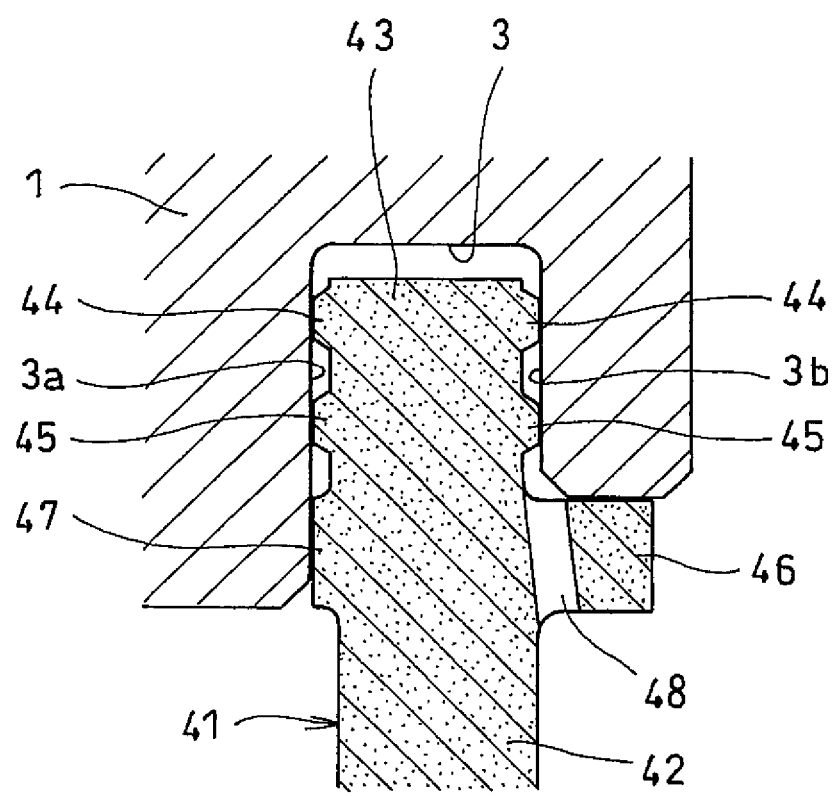
FIG. 8 is a sectional view illustrating a further different bearing seal.

In FIGS. 1 to 6, though the detent ribs 44 and 45 comprising annular lips are formed on both sides of each fitting portion 43, the ribs 44 and 45 are not limited to annular lips. FIGS. 7 and 8 illustrate different detent ribs 44 and 45. In FIG. 7, the detent ribs 44 and 45 comprise annular protrusions each having a circular arc-shaped section.

In FIG. 8, the detent ribs 44 and 45 comprise annular protrusions each having a quadrangular section. When the fitting portion 43 is fitted into the seal groove 3, the distal ends of the detent ribs 44 and 45 illustrated in either of FIGS. 7 and 8 strongly come into elastic contact with the side surfaces 3a and 3b of the groove 3, respectively, thereby preventing the fitting portion 43 from being pulled out of the groove 3.

As illustrated in FIGS. 7 and 8, for each of the bearing seals, if the radial positioning rib 46 is formed with an adhesive supplying hole 48 extending through the radial portion of the rib 46 into the opening of the seal groove 3, it is possible to fixedly attach the fitting portions 43 onto the respective seal grooves 3 by supplying an adhesive into the groove 3 through the hole 48, and thus to keep the bearing seal 41 very firmly mounted to the outer race 1.

Figure 9:
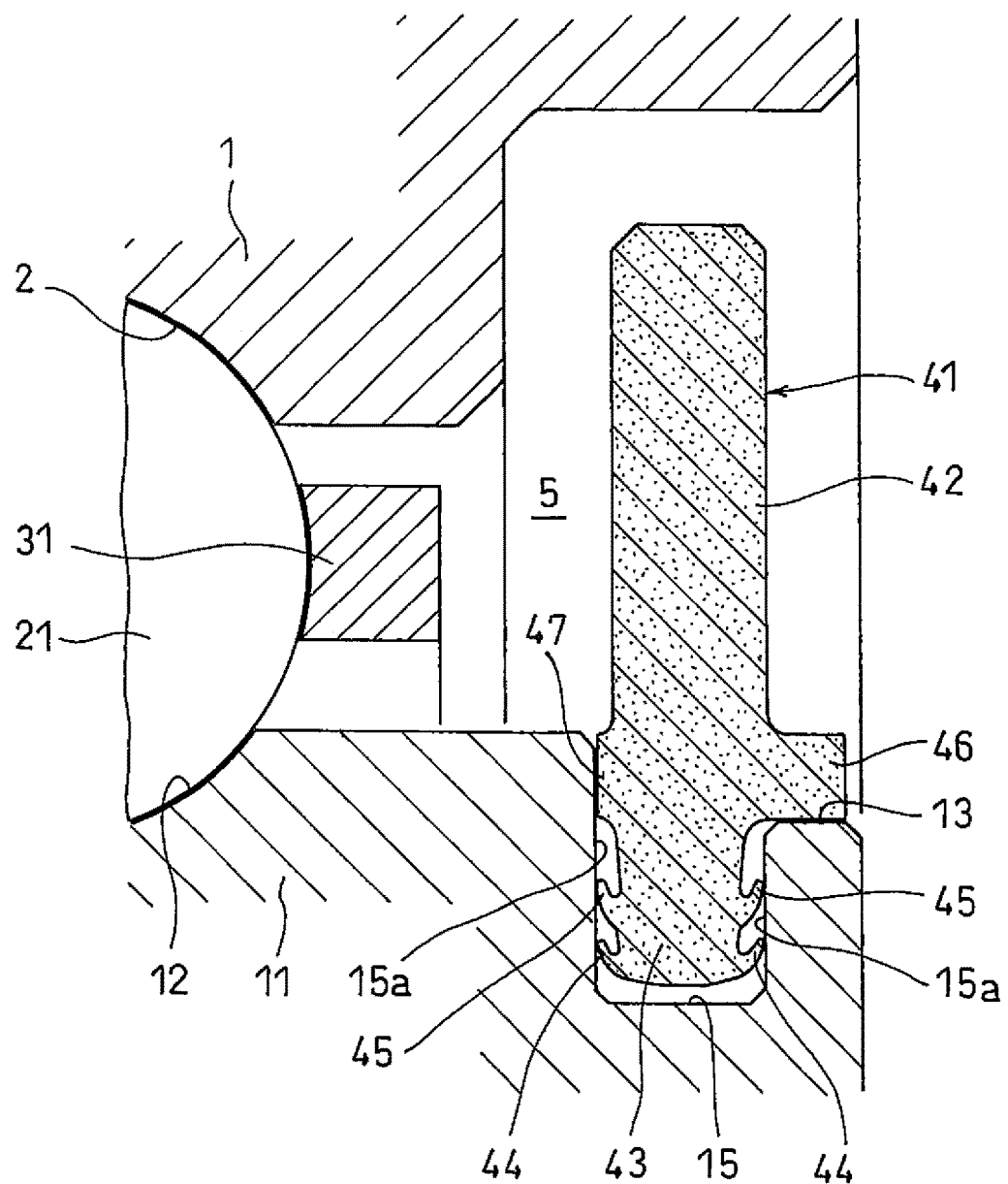
FIG. 9 is a sectional view of a rolling bearing according to another embodiment of the present invention.

Though the seal grooves 3 are formed in the inner diameter surface of the outer race 1 and the bearing seals 41 are mounted into the respective grooves 3 in the embodiment, as shown in FIG. 9, seal grooves 15 may be formed in the outer diameter surface of the inner race 11 and the bearing seals 41 may be mounted into these respective seal grooves 15 by fitting the fitting portion 43 of each bearing seal 41, which is formed on the other side of the base plate 42, in the seal grooves 15. In this arrangement, the fitting depth of the fitting portion 43 of each bearing seal 41 is restricted by bringing the positioning rib 46 into abutment with the small-diameter cylindrical surface 13 of the inner race 11, while each bearing seal 41 is axially positioned by bringing the axial positioning rib 47 into abutment with the inner side surface 15a of the seal groove 15. In this embodiment too, a plurality of detent ribs 45 are formed on at least one of both side surfaces of the fitting portion.

What is claimed is:

1. A bearing seal comprising a strip-shaped seal base plate made of rubber and having a rectangular section,
   wherein one side of the seal base plate is configured to be fitted into a seal groove formed in an inner diameter surface of an outer bearing race or formed in an outer diameter surface of an inner bearing race so that the bearing seal is made annular-shaped along the seal groove,
   whereby a bearing space is sealed which is defined between the outer bearing race and the inner bearing race opposed to the outer race,
   wherein the one side of the seal base plate configured to be fitted into the seal groove constitutes a fitting portion having two side surfaces, wherein detent ribs are formed on at least an outer side surface of the two side surfaces which is located closer to an open end of the bearing space,
   wherein the detent ribs are spaced apart from each other in a width direction of the seal base plate, wherein the detent ribs are configured such that due to fitting of the fitting portion into the seal groove, distal ends of the respective detent ribs come into elastic contact with a side surface of the seal groove,
   wherein heights of the detent ribs in a natural state thereof are predetermined such that the more rearward the detent ribs are located with respect to a direction in which the fitting portion is fitted into the seal groove, the larger the heights of the detent ribs are, and
   wherein interferences between the side surface of the seal groove and the respective detent ribs are predetermined such that, with the fitting portion fitted in the seal groove, the more rearward the detent ribs are located with respect to the direction in which the fitting portion is fitted into the seal groove, the larger the interferences are,
   wherein a radial positioning rib is formed on a side surface of the seal base plate that constitutes an outer side surface of the seal base plate when the seal base plate is mounted to one of the outer bearing race and the inner bearing race that is formed with the seal groove, and the radial positioning rib is configured to abut a circumferential surface of the one of the outer bearing race and the inner bearing race so as to control a fitting depth of the fitting portion in the seal groove,
   wherein an axial positioning rib is formed on a side surface of the seal base plate that constitutes an inner side surface of the seal base plate when the seal base plate is mounted to the one of the outer bearing race and the inner bearing race that is formed with the seal groove, and the axial positioning rib is configured to come into contact with an inner side surface of the seal groove so as to axially position the seal base plate, and
   wherein, with the seal base plate fitted into the seal groove, the seal base plate is kept out of contact with one of the inner bearing race and the outer bearing race that is not formed with the seal groove.

2. The bearing seal according to claim 1, wherein the detent ribs comprise annular lips having the distal ends and being configured such that due to the fitting of the fitting portion into the seal groove, the distal ends of the respective annular lips are elastically deformed so as to be bent rearward, with respect to the direction in which the fitting portion is fitted into the seal groove, by coming into contact with the side surface of the seal groove, and such that due to the elastic deformation, the distal ends of the respective annular lips come into elastic contact with the side surface of the seal groove.

3. The bearing seal according to claim 1, wherein the detent ribs comprise annular protrusions each having a circular arc-shaped section or a quadrangular section, and wherein the annular protrusions are configured such that due to the fitting of the fitting portion into the seal groove, the annular protrusions are elastically deformed in an axial direction by coming into contact with the side surface of the seal groove.

4. A rolling bearing with a bearing seal, the bearing comprising:
   an outer race;
   an inner race incorporated inwardly of the outer race; and
   rolling elements incorporated between opposed portions of the outer race and the inner race,
   wherein a seal groove is formed at an end portion of an inner diameter surface of the outer race or at an end portion of an outer diameter surface of the inner race,
   wherein the bearing seal is a strip member made of rubber and having a side portion configured to be fitted from an end of the side portion into the seal groove so that the bearing seal is made annular-shaped along the seal groove,
   whereby the bearing seal seals an opening of a bearing space defined between the opposed portions of the outer race and the inner race, and
   wherein the bearing seal is the bearing seal according to claim 1.

5. A bearing seal comprising a strip-shaped seal base plate made of rubber and having a rectangular section,
   wherein one side of the seal base plate is configured to be fitted into a seal groove formed in an inner diameter surface of an outer bearing race or formed in an outer diameter surface of an inner bearing race so that the bearing seal is made annular-shaped along the seal groove,
   whereby a bearing space is sealed which is defined between the outer bearing race and the inner bearing race opposed to the outer race,
   wherein the one side of the seal base plate configured to be fitted into the seal groove constitutes a fitting portion having two side surfaces,
   wherein detent ribs are formed on at least an outer side surface of the two side surfaces which is located closer to an open end of the bearing space,
   wherein the detent ribs are spaced apart from each other in a width direction of the seal base plate,
   wherein the detent ribs are configured such that due to fitting of the fitting portion into the seal groove, distal ends of the respective detent ribs come into elastic contact with a side surface of the seal groove,
   wherein a radial positioning rib is formed on a side surface of the seal base plate that constitutes an outer side surface of the seal base plate when the seal base plate is mounted to one of the outer bearing race and the inner bearing race that is formed with the seal groove, and wherein the radial positioning rib is configured to abut a circumferential surface of the one of the outer bearing race and the inner bearing race so as to control a fitting depth of the fitting portion in the seal groove, and
   wherein the radial positioning rib is formed with an adhesive supplying hole extending through a radial portion of the radial positioning rib into an open end portion of the seal groove.

* * * * *